United States Patent [19]

Griffin et al.

[11] 4,354,879

[45] Oct. 19, 1982

[54] UTILIZATION OF FIBROUS WASTE

[76] Inventors: Gerald J. L. Griffin, 2 Waldemar Ave., Ealing, London W13 9PY; Adrian J. Emck, Unit 1, Lea Green Colliery, Lowfield La., St. Helens, Merseyside WA9 5BG, both of England

[21] Appl. No.: 226,838

[22] Filed: Jan. 21, 1981

[51] Int. Cl.³ .............................. C08B 1/00; C08L 1/00
[52] U.S. Cl. .................................. 106/163 R; 162/180; 106/200
[58] Field of Search .................. 106/163, 200; 162/99, 162/180

[56] References Cited

FOREIGN PATENT DOCUMENTS 2025432 1/1980 United Kingdom .

OTHER PUBLICATIONS

Chemical Abstracts 42:7524g, 1948; 53:7595i, 1959; 80:35,832b.

*Primary Examiner*—Theodore Morris
*Attorney, Agent, or Firm*—Stevens, Davis, Miller & Mosher

[57] ABSTRACT

A board or similar product is made from fibrous spent hops, the resin content of which sets the product. The product is preferably formed by catalyzed hot-pressing.

8 Claims, No Drawings

UTILIZATION OF FIBROUS WASTE

DESCRIPTION

The present invention relates to the utilisation of fibrous waste and in particular to the production of boards and similar products from fibrous waste material.

In recent years much of the timber previously used for construction and general domestic purposes, such as furniture making, has been replaced by manufactured materials such as hardboard and chipboard. These manufactured materials, although originally produced to use up waste wood left over from sawmill operations, are now used on such an extensive scale that substantial quantities of valuable timber are rendered directly into wood chips and fibres for their production.

A new waste fibre board has now been discovered, utilising a true waste material which is particularly suitable for compaction into boards and similar products.

In accordance with the present invention boards or similar products comprise compacted hop fibre waste. Generally it is envisaged that the products of the present invention comprise hop fibre waste as their major, if not only, fibre component. The invention also includes processes in which material comprising hop fibre waste is compacted to give boards and similar products.

The use of hops in the manufacture of beer is well known and hop waste is available as a by-product from breweries and hop processors. Hop waste is typically fibrous in nature and may initially contain a high proportion of water, often up to about 80% by weight or more of water. Usually, therefore, it is desirable to remove excess moisture from the hop waste before compaction, for instance by centrifuging and subsequent drying e.g. at elevated temperature. Preferably the water content of the hop waste is decreased to less than about 50% or especially less than about 10% e.g. about 8%, by weight before compaction. It will be appreciated, however, that the hop waste should not be overdried as this may give rise to undesirably brittle products on compaction, and thus preferably the hop waste contains at least about 1% by weight of water.

The hop waste may be mixed with suitable resins or other binders prior to compaction, and such resins and binders include those used in the production of hardboard, chipboard and similar products and are usually added in similar proportions. In accordance with the present invention, however, it has been discovered that the natural resin present in the hop fibre material may be used to provide a binding agent for compacted products. Solvent extraction techniques have revealed that the hop fibre waste contains from about 3 to 4%, on dry weight, of resin, and thus advantageously the hop fibre waste may provide all the binding agent required for compaction.

Thus in a preferred embodiment the products of the present invention comprise compacted hop fibre waste in which the binding agent is provided by natural resin originally present in the waste.

Generally, otherwise, other additives such as preservatives, fire-proofing agents, water repellants and sealants, may be added to the hop waste as desired. In addition the hop waste may be subjected to other preparation besides removal of water, such as sterilisation.

The hop waste may be cold-pressed to give the products of the invention, for instance when a suitable cold-setting resin or binding agent has been added. More usually, however, the hop waste is compacted by a hot pressing technique. Pressures used, both for hot and cold pressing, may vary widely, for instance from a few hundred e.g. about 100, up to a few thousand e.g. about 3,000 psi, dependent upon the density required for the products. Generally, for hot-pressing techniques, pressures of greater than about 300 psi, preferably greater than about 500 psi, especially about 850 psi have been found to be satisfactory for production of hardboard like products. Higher pressures, for instance from about 1000 up to 2000 psi or more e.g. about 2400 psi, however, generally give rise to stronger and more compact products. The equipment and techniques employed for compaction of hop waste are generally similar to those employed for the production of other compacted waste fibre products.

Generally the hop fibre waste is hot pressed at temperatures of greater than about 100° C. for periods of up to about 20 minutes, though excessively elevated temperature e.g. over about 180° C. may lead to undesirable charing. Preferably hot pressing is carried out at temperatures from about 150° C. up to about 170° C. for from about 3 up to about 7 minutes.

In accordance with the invention, it has also been discovered that addition of suitable catalysts to the hop waste, before hot pressing, enhance the binding properties of the natural resin present therein. The natural hop resin typically contains carbonyl compounds, and it is believed that catalysts for the curing and setting of such compounds are particularly suitable for use in the present invention. In practice it has been found that hexamine (hexamethylene tetramine) is highly satisfactory as a catalytic additive for the hot pressing of hop fibre waste, and may conveniently be introduced to the waste as a solution, for instance in water or alcohol, using preferably about 2 g of solid catalyst per 100 g of waste (dry weight). The use of a catalyst may be detectable in the compacted products, and generally leads to increased strength properties as compared with uncatalysed products, for instance strength increase of 75% or more. Advantageously the catalysed hot pressed products of the present invention may exhibit strength properties comparable with hardboard.

The products of the present invention may be produced in any appropriate form, such as boards, sheets, blocks, or beams including those forms in which hardboards, chipboards and other similar waste fibre boards are produced. Particularly advantageously, however, hop fibre waste exhibits plastic-like properties on hot pressing and thus in a preferred embodiment products may be produced in a moulded form. Such moulded products may conveniently be tailor-made for the furniture industry. For instance, boards may be produced with pre-moulded runners for drawers, or in a pre-moulded form to facilitate jointing of boards, or with moulded relieved design on their surfaces. An example of such a moulded product in the form of a board having elongate parallel ridges moulded into one or both of its surfaces, for instance with elongate ridges moulded into both surfaces, the ridges mutually perpendicular.

Generally also the hop fibre board of the invention may have surface treatments applied for decorative or other purposes. For example materials such as waste leather, or dried leaves may be applied to the surface of the hop board during hot pressing or otherwise and may provide a highly desirable decorative finish.

The invention is further illustrated in the following non-limiting examples which relate to the production of hop fibre boards by hot pressing techniques.

EXAMPLE 1

Uncatalysed Hop Fibre Board

Raw spent hops are obtained from a brewery (Guinness Park Royal) and initially contain about 86% moisture. 50% of the water is then removed by centrifuging at 2000 rpm in an 8" diameter Broadbent basket centrifuge, and the hop waste is further dried on trays in an oven at 80° C. to about 8% water content.

About 200 g samples of the dried hop waste without any additional resin are then compressed to 4 mm thickness boards in a 250 mm square heavy steel box tool under 6 different hot pressing regimes. The quantity of waste used in each case, is chosen so as to yield a 4 mm thickness board under the various hot pressing conditions employed. 4 mm × 12.7 mm samples of each board are then tested for cross-breaking strength on an Instron machine housed in an air-conditioned room at 50% RH and 23° C. The Instron machine is set with the distance between the outer supports of the 3-point loading system 38.1 mm apart, with cross-head spaced 25.4 mm/minute and full scale range set to 0–100 lbf. The results obtained are given in Table 1 below and are comparative with results of about 67 lbf. and about 51 lbf. obtained similarly for plywood and hardboard respectively.

TABLE 1

Cross-breaking strength in lbf. of 4 mm hop-board made under 6 differing hot pressing regimes.

| 150° C. 850 psi TIME | | | 160° C. 20 minutes PRESSURE | | |
| --- | --- | --- | --- | --- | --- |
| 8 mins. | 15 mins. | 30 mins. | 400 psi | 700 psi | 850 psi |
| 14.5 lbf. | 17 | 24 | 18 | 20.5 | 28 |
| 20 | 13.5 | 23.5 | 13 | 24.5 | 22.5 |
| 13.5 | 18.5 | 21.5 | 23 | 20 | 28 |
| 16.5 | 15.5 | 18 | 21.5 | 17 | 26.5 |
| 13.5 | 21.5 | 21 | 21 | 15.5 | 30.5 |
| 13 | 21 | 23 | 24.5 | 23.5 | 14.5 |
| 12.5 | 12.5 | 19.5 | 20 | 19.5 | 19 |
| 23 | 12 | 24.5 | 23.5 | 20 | 20.5 |
| 14.5 | 11.5 | 17 | 17 | 25.5 | 19.5 |
| 13 | 17 | 25.5 | 25.5 | 18.5 | 27.5 |
| 18 | 18.5 | 22.5 | 20.5 | 21 | 20.5 |
| 21 | 18 | 19 | 25 | 20.5 | 23.5 |
| 19 | 13 | 24.5 | 17.5 | 18.5 | 28 |
| 25 | 17 | 26.5 | 16 | 17.5 | 17 |
| Average | | | | | |
| 16.93 | 16.18 | 22.14 | 20.43 | 20.14 | 23.25 |
| Standard Dev. | | | | | |
| 3.96 | 3.14 | 2.80 | 3.60 | 2.74 | 4.72 |

12.7×4×40 mm samples of a hop-board prepared above (850 psi, 160° C., 20 minutes) are tested for impact strength using a modified version of the Izod machine, working edgewise on to the samples which are left un-notched. The results obtained are given in Table 2 as joules per 12.7 mm, and which includes results obtained similarly for a hardboard.

TABLE 2

Impact strength in joules per 12.7 mm for 12.7 × 4 × 40 mm hop-board (850 psi, 160° C. 20 mins) and hardboard samples.

| Hardboard | Hopboard |
| --- | --- |
| 0.763 | 0.307 |
| 1.213 | 0.307 |
| 0.914 | 0.460 |
| 1.801 | 0.460 |
| 1.362 | 0.307 |
| 1.213 | 0.763 |
| 1.064 | 0.307 |

TABLE 2-continued

Impact strength in joules per 12.7 mm for 12.7 × 4 × 40 mm hop-board (850 psi, 160° C. 20 mins) and hardboard samples.

| Hardboard | Hopboard |
| --- | --- |
| 1.213 | 0.914 |
| 0.763 | 0.460 |
| 1.064 | 0.460 |
| 1.36 | 0.612 |
| Average | |
| 1.06 | 0.45 |
| Standard Deviation | |
| 0.44 | 0.23 |

EXAMPLE 2

Similarly to Example 1, a 4 mm board is prepared from dried hop fibre waste except that prior to compaction the hop fibre is treated with catalyst solution (8 g of hexamine to each 100 g of dried waste, added as a solution of 10 g of hexamine per 100 ml of alcohol). Hot pressing is carried out at 150° C. at a pressure of 750 psi for 10 minutes and also an uncatalysed board is similarly prepared.

4×12.7 mm samples of each board are then tested for cross breaking strength on an Instron machine as in Example 1 except that the distance between the supports is increased to 50.8 mm and the loading rate decreased to 2.54 mm/minute. The results obtained are given in Table 3 and clearly show that the cross breaking strength of the catalysed board is more than doubled with respect to the uncatalysed board and is approximately the same as would be expected for a hardboard.

TABLE 3

Cross-breaking strength in lbf of catalysed hopboard as compared with uncatalysed hopboard.

| Uncatalysed | Catalysed |
| --- | --- |
| 11.5 | 29.9 |
| 11.5 | 27.6 |
| 10.5 | 21.7 |
| 9.9 | 25.4 |
| 9.5 | 23.4 |
| 11.5 | 21.9 |
| 13.5 | 22.5 |
| 11.0 | 17.0 |
| Mean | |
| 11.1 | 23.7 |
| S.D. | |
| 1.23 | 3.97 |

I claim:

1. A board or solid product made from fibrous material compacted with a settable binder characterised in that the fibrous material consists essentially of raw hop waste which is fibrous in character and contains natural resin which provides at least part of the binder.
2. A product as claimed in claim 1 wherein the natural resin from the hop waste provides substantially all the binder.
3. A method of manufacturing a product as claimed in claim 1 or claim 2 which comprises a hot-pressing step wherein, prior to said step, a curing or setting catalyst is added to the waste.
4. A method as claimed in claim 3 wherein the catalyst is suitable for setting carbonyl compounds.
5. A method as claimed in claim 4 wherein the catalyst is hexamine.
6. A fiber board comprising compressed hop fiber bonded together with a binder comprising resin naturally occurring in the said hop fiber.
7. A process for making a fiber board which comprises pressing a fibrous material containing hop fiber which contains from about 1% to about 10% by weight of moisture and from about 3% to about 4% of a natural occurring resin under a pressure whereby the fibrous material becomes compacted into a board.
8. The product of the process of claim 7.

* * * * *